D. S. TROXEL.
BICYCLE SADDLE.
APPLICATION FILED DEC. 14, 1911.
1,022,447.
Patented Apr. 9, 1912.
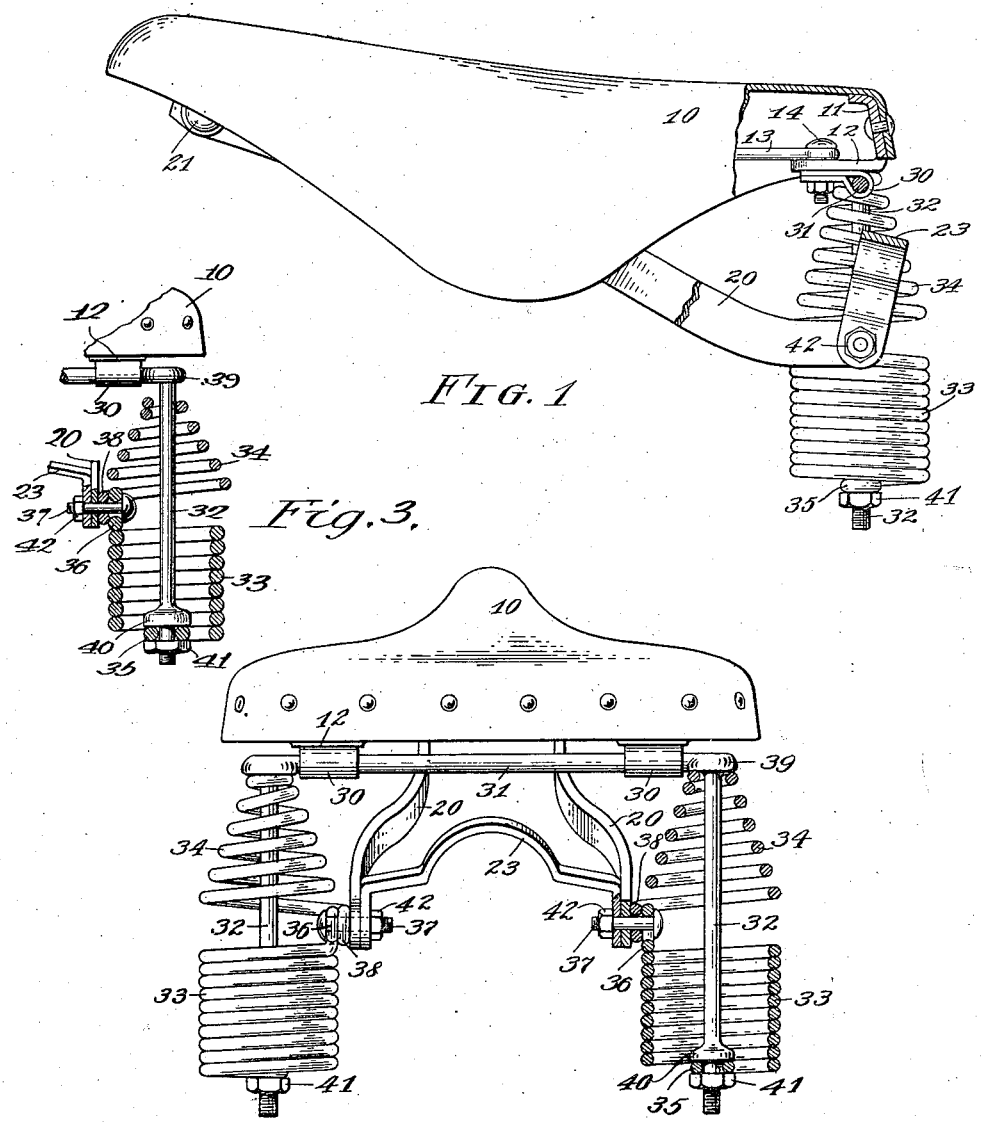
WITNESSES:
INVENTOR,
David S. Troxel,
BY Albert H. Bates
ATTY.

UNITED STATES PATENT OFFICE.

DAVID S. TROXEL, OF ELYRIA, OHIO.

BICYCLE-SADDLE.

1,022,447. Specification of Letters Patent. Patented Apr. 9, 1912.

Application filed December 14, 1911. Serial No. 665,603.

*To all whom it may concern:*

Be it known that I, DAVID S. TROXEL, a citizen of the United States, residing at Elyria, in the county of Lorain and State of Ohio, have invented a certain new and useful Improvement in Bicycle-Saddles, of which the following is a full, clear, and exact description, reference being had to the accompanying drawings.

The object of this invention is to provide a saddle for bicycles, motorcycles, etc., which, while being simple and cheap in construction and durable in service, shall give a very elastic support to the rider, relieving, by easy spring action, jars or shocks. To this end I have devised a saddle which is effectively supported at the rear end by two pairs of springs, one pair on each side, so arranged that both springs of each pair may support the load. By this means I am enabled either to have both springs of each pair constantly acting to support the load, whereby they may be of very light and elastic form, or, if desired, I can arrange the load to be normally carried by one spring and, on an extra depression, taken by the other additionally, after the manner of a shock absorber. This latter feature is illustrated specifically in Fig. 3. The springs are connected by a yoke which is swiveled to the saddle frame or cantle. This enables the parts to swing as desired, increasing the freedom with which the saddle plays up and down without straining the parts.

The invention comprises the means above referred to for providing a simple and elastic support for the saddle.

It comprises also the particular embodiment of these features shown in the drawing and hereinafter more fully described.

In the drawing, Figure 1 is a side elevation and Fig. 2 a rear elevation of my saddle embodied in an approved form. Each of these views are shown partly in section. Fig. 3 is a detail illustrating the arrangement of the springs to obtain a shock-absorber action.

Referring to the drawing, 10 indicates the saddle seat, which may be formed in the usual manner, of leather, or as desired. At its rear this seat portion extends over and is secured to the metal cantle 11. The cantle is formed with inwardly extending ears 12, from which a brace 13 leads forward and is secured in any suitable manner to the front end of the saddle.

20 indicates the main frame of the saddle support. At its forward end this is pivoted as at 21 in some suitable manner to the saddle proper, and the support near its rear end divides into two arms extending beneath the cantle. The rear ends of these arms are braced preferably by the arch-shaped cross bar 23. The forward and intermediate portions of the support and the means pivotally connecting it with the front of the saddle are not shown in the drawings, as they may be of any suitable construction.

Secured to the under side of the cantle ears 12 are clips 30. Each of these clips is shown as consisting of a piece of sheet metal bent on itself and secured by the same bolt 14 which holds the saddle brace 13 to the ear. Mounted in these clips is a yoke 31 which extends crosswise of the saddle beneath its rear end and then turns downwardly in a pair of substantially vertical rods 32. Surrounding each rod 32 is a pair of springs designated 33 and 34. The spring 33 is preferably a tight wound vertical helix having at its lower end a central, horizontal eye 35 which embraces and is connected to the rod 32, and at its upper end on the inner side a vertical eye 36 which surrounds a bolt 37 carried by the saddle support. The spring 34 is preferably an open conical helix, as shown, having at the inner side of its lower end a vertical eye 38 surrounding the bolt 37 and having the last turn at its upper end small enough to closely surround the rod 32 and be adapted to be engaged by the horizontal portion of the yoke.

As shown, the yoke 31 has a flattened or enlarged portion 39 where the vertical rod 32 joins the horizontal portion, and this enlarged portion forms a head adapted to rest on the upper end of the spring 34. Near its lower end the rod 32 has the enlarged shoulder 40 which rests on the eye 35 and below this point the rod is threaded to receive the nut 41.

It will be seen that the single bolt 37, together with its nut 42, furnish the means of securing the two springs and one side of the cross bar 23 to one arm of the saddle support 20. The securement for the lower end of the spring 33 is very simple by reason of the integral shoulder on the rod and the nut screwing on the rod, while the upper portion of the upper spring is held in place without special devices.

The lower spring is a tension spring and is accordingly preferably wound tight and stretched under the weight of the rider. The upper spring is a compression spring and the open conical helix operates very efficiently for such action. By making both springs constantly carrying the load, as shown in the drawing, I am enabled to reduce the size of the springs over constructions where all the weight on a side comes on one spring. By thus making the springs lighter, they may be made more elastic, and thus give an easier support to the rider. If desired, however, I may allow play between the saddle and either spring and normally carry the weight entirely by the other spring, reserving the normally idle spring to come into action on an excessive downward movement, thus acting as a shock absorber. This is illustrated in Fig. 3, where the tension spring 33 normally carries the entire load, and is accordingly made heavier, and the compression spring 34 acts as a shock-absorber and is normally out of engagement with the head 39 of the yoke.

By connecting the yoke 31 pivotally to the cantle by means of the straps 30, the yoke may swing on such horizontal axis, as the saddle plays up and down. In such action, the springs tip, as required, about the axis of the bolt 37. Accordingly, there is no strain on the fastening as the saddle moves and it is free to play up and down in service.

Having thus described my invention, what I claim is:

1. In a device of the character described, the combination, with a seat and support, of two interposed springs, one a compression spring, the other a tension spring, and the two independently connected with the support and both serving to resist downward movement of the saddle.

2. In a bicycle saddle, the combination, with a seat and saddle support, of two pairs of interposed springs, each pair comprising both a compression spring and a tension spring independently connected with the saddle support.

3. In a bicycle saddle, the combination, with a saddle seat and saddle support, of a pair of depending rods connected with the seat, two pairs of springs surrounding said rods respectively, each pair having a tension spring connected at its lower end with the rod and at its upper end with the support, and a compression spring connected at its lower end with the support and at its upper end with the rod.

4. In a bicycle saddle, the combination, with a seat and support, of a yoke pivotally connected with the seat having two depending portions, two springs connected at their lower ends with the lower ends of such depending portions and at their upper ends with the support, and two additional springs connected at their lower ends with the support and having their upper ends engageable by shoulders on the yoke.

5. In a bicycle saddle, the combination of a seat, a support having a pair of rearwardly extending bars, a brace connecting the rear ends of said bars, a pair of rods depending from the seat on opposite sides of the rear end of the support, and two pairs of springs, each pair surrounding one of the rods and consisting of a close coiled helical tension spring connected at its lower end with the rod and at its upper end with the support and an upper spring consisting of an open wound conical compression spring connected at its lower end with the support and with its upper end closely surrounding the rod.

6. In a bicycle saddle, the combination, with a saddle support and saddle seat, of a yoke pivotally connected with the seat and having two rods depending on opposite sides of the support, two helical tension springs centrally connected at their lower ends with the rods and at the inner sides at their upper ends with the support, and two conical compression springs closely surrounding the rods near their upper ends and at their lower ends connected with the support, both springs being connected by the same bolt with the support.

7. In a bicycle saddle, the combination, with a support, of a seat having a cantle with forward projection, straps secured to the projections, a yoke pivoted to the cantle by such straps, and springs between the yoke and support.

8. In a bicycle saddle, the combination, with a support having rearwardly projecting spaced bars, of a saddle seat having a cantle with a forward projection below the seat, a yoke pivotally connected with such forward projection of the cantle and having two depending rods outside of the rear ends of the support, two pairs of springs surrounding said two rods respectively, each pair consisting of a tension spring and a compression spring, the tension spring being connected at its lower end with the lower end of the rod and at its upper end with the support, and the compression spring being connected at its lower end with the support and having its upper end adapted for engagement by the yoke.

9. In a bicycle saddle, the combination, with a seat and support, of a yoke pivotally connected with the seat and comprising a horizontal portion and two depending rods, the horizontal portion having an enlarged head where the rods depend from it, and two pairs of springs each including a tension spring connected at its upper end with the support and at its lower end with the lower end of the rod, and a compression spring connected at its lower end with the support and formed to be abutted at its upper end by the enlargement of the yoke.

In testimony whereof, I hereunto affix my signature in the presence of two witnesses.

DAVID S. TROXEL.

Witnesses:
  H. C. JOHNSON,
  ALTA MYERS.

Copies of this patent may be obtained for five cents each, by addressing the "Commissioner of Patents, Washington, D. C."